Jan. 28, 1936.  W. TURNER  2,029,042
VARIABLE SPEED MECHANISM
Filed Feb. 26, 1935  2 Sheets-Sheet 2
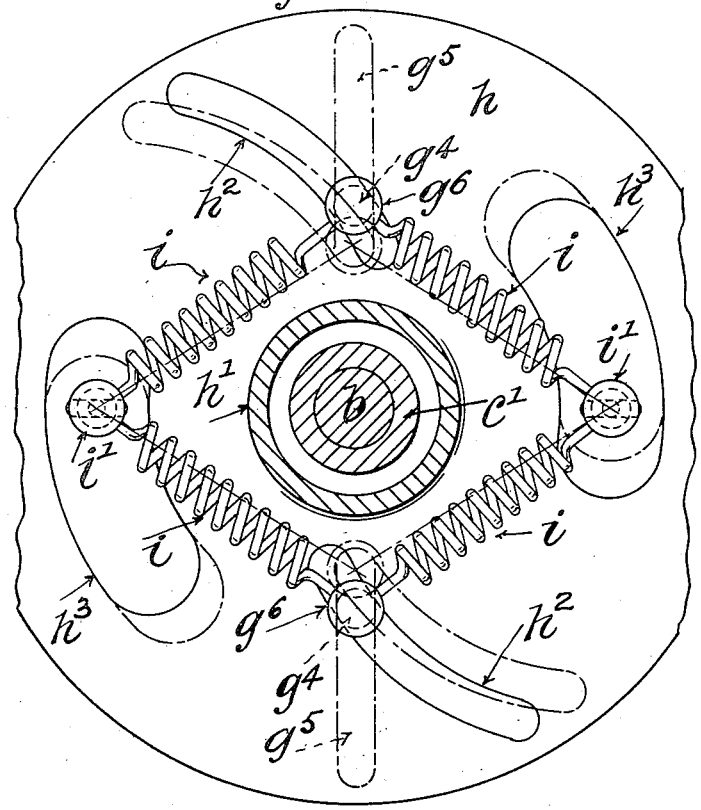
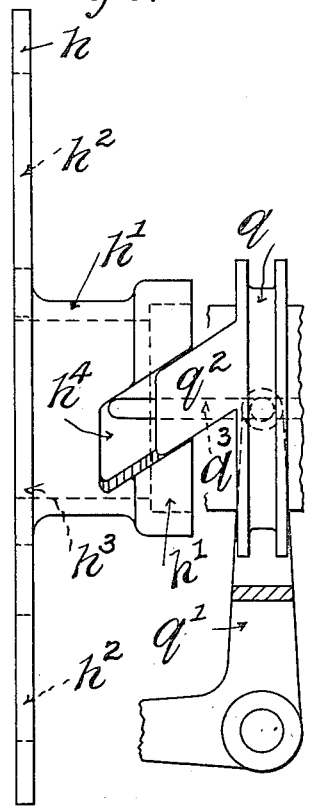
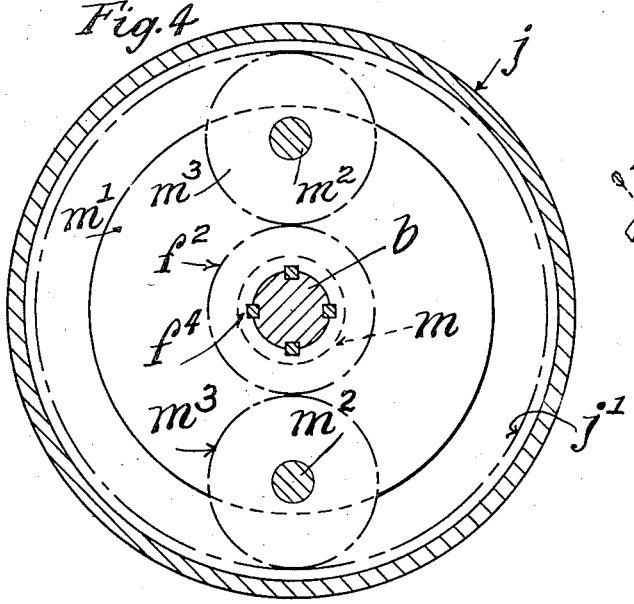
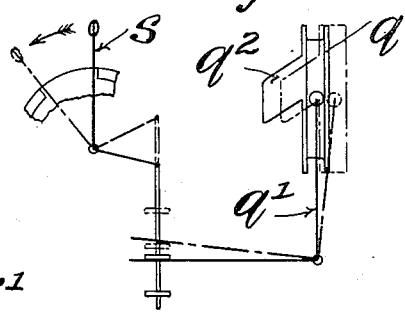
INVENTOR:
WILLIAM TURNER Patented Jan. 28, 1936

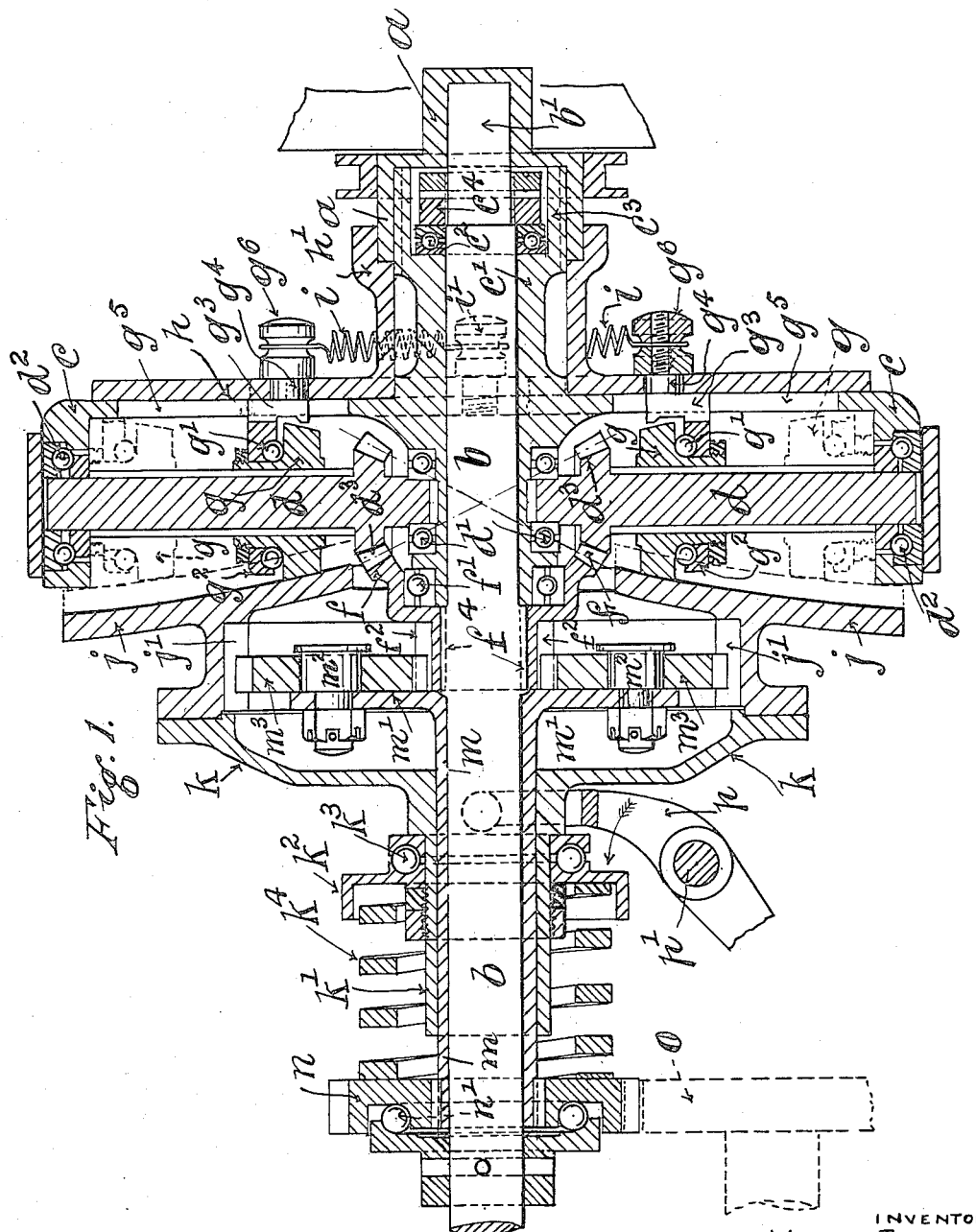

2,029,042

UNITED STATES PATENT OFFICE 2,029,042

VARIABLE SPEED MECHANISM

William Turner, Longsight, Manchester, England

Application February 26, 1935, Serial No. 8,228
In Great Britain February 28, 1934

6 Claims. (Cl. 74—260)

This invention is concerned with variable speed gear or mechanism such as is adapted to be used on motor vehicles to be interposed between the engine and the drive mechanism for the wheels, but the variable speed mechanism can be used in other situations where an engine or source of power is to transmit the drive to what has to be driven and where provision must be made for the obtainment or transmission of a variable speed or for gradually reaching a maximum or a pre-determined speed.

The simplest application of the invention is perhaps in regard to motor vehicles, the proposed gear mechanism or variable speed drive being interposed between the engine and the Cardan or driven shaft, and there is preferably introduced in the proposed gear mechanism a reverse gear; or a reverse gear may be otherwise combined.

The proposed gear mechanism enables variable speeds to be transmitted without the employment of the normal gear box and gear changing mechanism, the control of the engine or motor being through a pedal or lever, or the speed transmitted through the proposed gear mechanism may be mechanically controlled. Also as already suggested a reverse gear may be employed which is not combined in the proposed gear mechanism.

Use is made of an unequal balance gear arrangement or mechanism which comprises for example bevel gears, balanced bevels being also mounted on a rotary mass. There is also used bevelled or rimmed friction wheels movable inwards and outwards on radial shafts carried by the rotary mass. These bevelled or rimmed friction wheels are adapted to move outwards from the centre automatically under centrifugal action and to be drawn inwards by spring or other provision. Or they may be moved outwards or inwards to a variable extent by mechanical means. There is also provided a rotary friction plate with shaped interior face to conform with the shaping of the bevelled or rimmed friction wheels. This rotary friction plate combines with the gear structure and is movable end-on and serves as a clutch or controlling element, as when withdrawn the gear drive goes out of action, whilst if desired when fully engaged, the rotary friction plate can become locked or engaged with the rotary mass carrying the gear.

The rotary friction plate is slidably mounted and capable of being driven, and there is provided a bevel gear, upon which operates balanced bevel or other gear operated from the engine or motor. The rotary mass carries the balanced bevel gears, and also the bevelled or rimmed friction wheels, and the latter move outwards under centrifugal action and are or may be drawn in by springs, the engagement of the rotary friction plate effecting driving at a speed according to the distance the bevelled or rimmed friction wheels lie from the centre or axis of the gear. Any appropriate mechanism may be used to operate or control the rotary friction plate, and any proper connections can be made from the rotary mass to the part to be driven, and a reverse gear may be combined in the mechanism, or provided to co-operate therewith to permit reversal. Any speed ratio from "zero" or "neutral" is obtainable (within limits) of the rotary friction plate according to the disposition thereon at any time of the bevelled or rimmed friction wheels.

An embodiment of the invention in a variable speed mechanism for motor vehicles which provides a variable forward speed drive, a "neutral" position and "reverse" drive, is illustrated in the accompanying drawings, and wherein:—

Fig. 1 is a sectional elevation of a variable speed mechanism, the same having combined within it a reversing gear.

Fig. 2 is a view of a cam plate and spring arrangement for controlling and retracting the bevelled or rimmed friction wheels.

Fig. 3 indicates diagrammatically, means automatically moved by the cam plate, or which can be mechanically operated to move the cam plate to set or determine the position of the bevelled or rimmed friction wheels.

Fig. 4 shows separately a planetary gear which may transmit the variable speed and provides the reverse motion.

Fig. 5 is a diagram indicating means to move the cam plate, and to permit of its automatic movement.

In the structure illustrated, the engine or motor (not shown) is supposed to drive the sleeve-like contrivance $a$, and the fly-wheel can be mounted about the boss thereof. This sleeve-like contrivance is mounted to revolve about the turned end $b^1$ of the fixed shaft $b$, upon which fixed shaft is mounted the elongated boss $c^1$ of the rotary mass $c$. A ball bearing $c^2$ takes the end thrust and supports the outer end of the rotary mass $c$. The outer boss-like end $c^3$ of the rotary mass $c$ is castellated, as is the bore of the sleeve-like contrivance $a$, so that, these two elements engage and a driving connection is established whilst the ball bearing $c^2$ and its fixing means $c^4$ are enclosed. The rotary mass $c$ provides what amounts to a housing and the interior hub-like portion is adapted to receive ball-bearings $d^1$ for the inner ends of radially arranged castellated shafts $d$, the outer ends of which are supported in ball bearings $d^2$ mounted in the periphery of the rotary mass $c$. The castellated shafts $d$ are formed or provided with bevel gears $d^3$ and these bevel gears $d^3$ engage the teeth of a bevel gear $f$, the boss of which encloses a ball bearing $f^1$, the bevel gear $f$ being fixed at $f^4$ by castellations on the stationary shaft $b$, its boss or hub having an elongated ring of teeth $f^2$. Thus, when the rotary mass $c$ is driven, the bevel gears $d^3$ engaging the stationary bevel gear $f$ are caused to revolve and so rotate the castellated shafts $d$. Upon the castellated shafts $d$ are mounted the bevelled or rimmed friction wheels $g$ which are free to slide longitudinally upon the castellated shafts $d$. These bevelled or rimmed friction wheels $g$ rotate upon ball bearings $g^1$ and are embraced by forks or collars such as $g^2$ with tail-pieces $g^3$ which tail-pieces are guided in radial slots $g^5$ fashioned in the wall of the rotary mass $c$. Said tail-pieces $g^3$ have roller bearings fitted at $g^4$ which engage curved slots $h^2$ formed in an angularly movable cam plate $h$ which is combined with the rotary mass $c$ and the boss $h^1$ of which fits upon the boss $c^1$ of the rotary mass $c$. There are shaped nuts or extensions $g^6$ applied to the screw-threaded shanks of the tail-pieces $g^3$ to which one end of springs $i$ are attached. The other ends of the springs $i$ are attached by anchorage devices $i^1$ adjustably fixed to the rotary mass $c$, curved slots $h^3$ being cut in the angularly movable cam plate $h$ to permit fixing of the anchorage devices $i^1$. When the bevelled or rimmed friction wheels $g$ are moved radially outwards, and the tail-pieces $g^3$ and roller bearings $g^4$ move outwards, the springs $i$ are extended and the angularly movable cam plate $h$ is slightly turned. The springs $i$ also operate to draw inwards the bevelled or rimmed friction wheels $g$ when requisite. When the rotary mass $c$ is driven at speed, the castellated shafts $d$ are rotated on their axes by engagement of the bevel gears $d^3$ and $f$, and, due to centrifugal action, the bevelled or rimmed friction wheels $g$ are gradually moved radially outwards according to the speed imparted to the rotary mass $c$ by the engine or motor. The bevelled or rimmed friction wheels $g$ are capable of imparting variable speeds to a co-operating friction plate when they are moved radially outwards or radially inwards with relation to such co-operating friction plate. Such a friction plate is shown marked $j$ and it has a carefully machined inner face. It is combined with a cover plate and boss $k$. The two structures $j$ and $k$ produce a hollow compartment to house a known planetary type of differential or balance gear. The friction plate $j$ is formed with an internal ring of say 60 elongated teeth $j^1$. There is mounted upon the fixed shaft $b$ a sleeve $m$ with annular plate $m^1$ and upon axles $m^2$ on said annular plate $m^1$ are mounted two or more pinions $m^3$ each with say 20 teeth which gear with the internal ring of teeth $j^1$ say 60 and the fixed ring of say 20 teeth $f^2$. This gear is so proportioned and driven as that at zero speed no driving motion is transmitted. If a speed above zero is transmitted, the drive is in a forward direction. If a speed below zero is transmitted then the drive is in a reverse direction. Upon the sleeve $m$ is a revolvable gear wheel $n$ which is keyed on said sleeve $m$ and this gear wheel $n$ works against a ball bearing $n^1$ one race of which is fixed on the shaft $b$, and this gear wheel through suitable gear such as diagrammatically indicated at $o$ communicates motion to the Cardan shaft or whatever conveys the drive. The extended sleeve $k^1$ of the cover $k$ is loose on the sleeve $m$ and it carries a plate $k^2$ fixed thereon which co-operates with a ball bearing $k^3$, a spring $k^4$ extending between the gear wheel $n$ and the plate $k^2$. By the foregoing arrangement, the spring $k^4$ acting on the cover $k$ keeps the rotary friction plate $j$ against the bevelled or rimmed friction wheels $g$. In order to de-clutch or move the rotary friction plate $j$ away from the bevelled or rimmed friction wheels $g$ a fork $p$ mounted on the shaft $p^1$ can be provided. When the fork $p$ is operated in the direction of the arrow (Fig. 1) it moves the rotary friction plate $j$ away from the rotary mass $c$. The pinions $m^3$ $m^3$ always remain in gear with the internal ring of teeth $j^1$ and the fixed ring of teeth $f^2$, the teeth $j^1$ being made sufficiently long for that purpose.

In Fig. 3 there is illustrated a slidable sleeve $q$ with striking lever $q^1$ guided upon a key $q^3$ said sleeve having a projecting actuator $q^2$ disposed at an angle. This projecting actuator $q^2$ engages an inclined gap cut in the boss $h^1$ of the cam plate $h$ and can be mechanically set to shift or adjust the bevelled or rimmed friction wheels $g$, which may be desirable in some applications of the driving gear. In the case of motor vehicles, the engine acting through the gears on the bevelled or rimmed friction wheels $g$ operates the cam plate $h$ and so causes the shaped part $h^4$ of the boss $h^1$ acting through the actuator to move the guided sliding sleeve $q$ which is free to move within limits. A known type of striking lever could be provided which would be uninfluenced with the bevelled or rimmed friction wheels in any position from zero or "neutral" to maximum speed.

A known structure of this type is illustrated diagrammatically at Fig. 5, wherein the lever structure $q^1$ of the striking lever can play within limits as the cam plate $h$ moves angularly. If it be desired to move the bevelled or rimmed friction wheels fully inwards radially to place the same in "reverse" position on the rotary friction plate $j$ the quadrant lever $s$ is operated to shift the slidable sleeve $q$ to cause the actuator to turn the cam plate $h$ and place the bevelled or rimmed friction wheels $g$ in the extreme inward position (that is, nearer the axis than is shown in Fig. 1).

The position of the bevelled or rimmed friction wheels $g$ at Fig. 1 is supposed to be the zero or "neutral" position and the gear is so proportioned that with a slow speed imparted to the rotary mass, no forward speed would be transmitted and the gear would be in "neutral". If the bevelled or rimmed friction wheels be moved still further inwards radially (by operating the quadrant lever $s$, see the dotted lines, Fig. 5) then the gear wheel $n$ due to the planetary gear group (gears $j^1$, $m^3$, $m^3$ and $f^2$) would rotate in a reverse direction.

When the required "reversal" has been effected, the bevelled or rimmed friction wheels would be moved to neutral, and the engine or motor accelerated. As the speed of the engine or motor increases, it drives the rotary mass $c$ at a greater speed, the bevel gears $d^3$, $f^2$ rotating the castellated shafts $d$ and correspondingly driving the bevelled or rimmed friction wheels $g$. Due to centrifugal action, the bevelled or rimmed friction wheels g are gradually moved outward radially, the slots $g^5$ guiding the tailpieces $g^3$, and under inceasing speed the bevelled or rimmed friction wheels move radially outwards until they reach the limit of movement permissible due to the rim of the rotary mass c. Thus the rotary friction plate j is driven at an increasing and variable speed according to the speed of the engine or motor, and the variable speed is transmitted through the rotary friction plate j, the gear $f^2$, $j^1$, $m^3$, $m^3$, to the sleeve m and gear wheel n.

When the bevelled or rimmed friction wheels are in the radially outward limit position they assume a position (indicated in dotted lines Fig. 1) which permits the rotary friction plate j to bear on or engage the overhanging periphery of the rotary mass c and the rotary mass c and rotary friction plate j revolve as one group. If the fork p be operated (as by a clutch) then the rotary friction plate j is at once moved out of gear against the action of the spring $k^4$ and disconnection with the drive from the engine or motor is effected. By moving the rotary friction plate (through operation of the clutch pedal) and slowing down the engine or motor, then the bevelled or rimmed friction wheels are moved radially inwards due to the action of the springs i and the cam plate h is slowly turned to permit the tail-pieces $g^3$ to move inwards in the slots $g^5$.

It may not be necessary in every case to combine a reversing gear in the variable speed gear, as same may not be required, and also it is obvious that a reverse gear of other kind may be provided or combined and operated by a gear lever, and in such case the variable speed gear would simply convey a variable driving speed from zero or "neutral" to a maximum in one direction, and the reverse gear would provide for reversal.

I declare that what I claim is:—

1. Variable speed mechanism for motor vehicles or other purposes comprising a stationary shaft, a rotary mass, means to drive said rotary mass, radial shafts carried by said rotary mass, gear to actuate said radial shafts, friction wheels on said radial shafts, means to guide said friction wheels to permit of inward and outward movement of same, an axially movable cone-shaped rotary friction plate with which said friction wheels co-operate, means to move said cone-shaped rotary friction plate axially, a gear mechanism co-operating with said movable cone-shaped rotary friction plate, means to convey motion from the friction plate through said gear mechanism to a part to be driven, all whereby a variable speed from "neutral" to a maximum can be transmitted to and conveyed to the part to be driven from said movable cone-shaped rotary friction plate.

2. Variable speed mechanism for motor vehicles or other purposes, comprising a stationary shaft, a rotary mass, means to drive said rotary mass, radial shafts carried by said rotary mass, gear to actuate said radial shafts, friction wheels on said radial shafts, means to guide said friction wheels to permit inward and outward movement thereof, an axially movable cone-shaped rotary friction plate with which said friction wheels co-operate, means to move said cone-shaped rotary friction plate axially, a planetary gear mechanism co-operating with said movable cone-shaped rotary friction plate and through which the latter transmits motion, means to convey motion from said planetary gear mechanism to a part to be driven, all whereby a variable speed from "neutral" to a maximum or a "reverse" motion can be transmitted to and conveyed to the part to be operated through said movable cone-shaped rotary friction plate.

3. In a variable speed mechanism as claimed in claim 1, a cam plate adapted to move angularly and having guide slots and adapted to co-operate with radially movable friction wheels mounted on castellated shafts, and means to act on said cam plate whereby the position of said friction wheels are governed with respect to the movable cone-shaped rotary friction plate.

4. In a variable speed mechanism as claimed in claim 1 and having a friction plate adapted to be driven at a variable speed through radially movable friction wheels and gear from a driven mass, and a planetary gear mechanism comprising gears $f^2$, $m^3$, $m^3$ and $j'$, said friction plate adapted to transmit motion to a part to be driven through said planetary gear mechanism.

5. Variable speed mechanism for motor vehicles or other purposes, comprising a stationary shaft, a rotary mass mounted thereon and adapted to be driven, radial shafts carried by said rotary mass, bevel gears on said radial shafts engaging a bevel gear fixed on said stationary shaft, friction wheels on said radial shafts, means to guide said friction wheels to permit inward and outward movement thereof, means to control inward and outward movement of said friction wheels, an axially movable cone-shaped rotary friction plate with which said friction wheels co-operate, means to move said cone-shaped rotary friction plate axially, a housing combined with said movable cone-shaped rotary friction plate, gear enclosed in said housing and co-operating therewith, means to convey motion from said gear enclosed in said housing to a part to be driven, all whereby a variable speed from "neutral" to a maximum or a "reverse" motion can be transmitted and conveyed from said movable cone-shaped rotary friction plate through the enclosed gear to the part to be driven.

6. Variable speed mechanism for motor vehicles or other purposes, comprising a stationary shaft, a rotary mass mounted thereon and adapted to be driven, radial shafts carried by said rotary mass, bevel gears on said radial shafts engaging a bevel gear fixed on said stationary shaft, friction wheels on said radial shafts, means to guide said friction wheels to permit inward and outward movement thereof, means to control inward and outward movement of said friction wheels, means to operate said means which control inward and outward movement of said friction wheels, an axially movable cone-shaped rotary friction plate with which said friction wheels co-operate, means to move said cone-shaped rotary friction plate end-on, a housing combined with the cone-shaped rotary friction plate, planetary gear located in said housing and co-operating therewith, means to convey motion from said planetary gear to a part to be driven, all whereby a variable speed from "neutral" to a maximum or a "reverse" motion can be transmitted and conveyed from said movable cone-shaped rotary friction plate through the enclosed planetary gear to the part to be driven.

WILLIAM TURNER.